US007330591B2

(12) United States Patent
Fukui et al.

(10) Patent No.: US 7,330,591 B2
(45) Date of Patent: Feb. 12, 2008

(54) APPARATUS FOR GENERATING A PATTERN RECOGNITION DICTIONARY, A METHOD THEREOF, A PATTERN RECOGNITION APPARATUS AND A METHOD THEREOF

(75) Inventors: Kazuhiro Fukui, Yokohama (JP); Osamu Yamaguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 906 days.

(21) Appl. No.: 10/372,312

(22) Filed: Feb. 25, 2003

(65) Prior Publication Data
US 2003/0198366 A1 Oct. 23, 2003

(30) Foreign Application Priority Data
Feb. 25, 2002 (JP) ............................. 2002-047332

(51) Int. Cl.
*G06K 9/46* (2006.01)
(52) U.S. Cl. ...................... 382/190; 382/118; 382/225; 707/6
(58) Field of Classification Search ............... 382/115, 382/118, 154, 276, 190, 220, 225, 224; 702/17; 375/261, 265; 902/5; 367/45; 707/6; 235/380
See application file for complete search history.

(56) References Cited

U.S. PATENT DOCUMENTS

| 6,466,685 | B1 * | 10/2002 | Fukui et al. ................. 382/115 |
| 6,501,857 | B1 * | 12/2002 | Gotsman et al. ............. 382/224 |
| 6,608,914 | B1 * | 8/2003 | Yamaguchi et al. .......... 382/118 |
| 6,690,814 | B1 * | 2/2004 | Yuasa et al. ................. 382/118 |
| 2003/0198366 | A1 | 10/2003 | Fukui et al. |

OTHER PUBLICATIONS

U.S. Appl. No. 10/980,310, filed Nov. 4, 2004, Nishiyama et al.
K. Fukui, et al., IEICE Trans, D-II, vol. J82-D-II, No. 4, pp. 613-619, "Face Recognition Under Variable Lighting Condition with Constrained Mutual Subspace Method-Learning of Constraint Subspace to Reduce Influence of Lighting Changes", Apr. 1999.

* cited by examiner

*Primary Examiner*—Sheela Chawan
(74) *Attorney, Agent, or Firm*—Oblon, Spivak, McClelland, Maier & Neustadt, P.C.

(57) ABSTRACT

The present invention solves an eigenvalue problem using a sum of projection matrixes for each subspace. A space which is spanned by a plurality of eigenvectors which are selected starting from those having a smaller eigenvalue is used as a constraint subspace.

10 Claims, 5 Drawing Sheets

APPARATUS FOR GENERATING A PATTERN RECOGNITION DICTIONARY, A METHOD THEREOF, A PATTERN RECOGNITION APPARATUS AND A METHOD THEREOF

CROSS-REFERENCE TO RELATED APPLICATIONS

This application is based upon and claims the benefit of priority from the prior Japanese Patent Application No. 2002-047332, filed Feb. 25, 2002, the entire contents of which are incorporated herein by reference.

BACKGROUND OF THE INVENTION

1. Field of the Invention

The present invention relates to an apparatus of generating a pattern recognition dictionary, a method thereof, a pattern recognition apparatus and a method thereof.

2. Description of the Related Art

In "Pattern Matching Method with Local Structure" by Kenichi Maeda and Sadaichi Watanabe, Shingakuron (D), Vol. J68-D, No. 3, pp. 345-352, 1985 and Jpn. Pat. Appln. KOKAI Publication No. 11-265452 are there proposed such a pattern recognition method as called a mutual subspace method which has been developed as an extension of subspace methods of "Pattern recognition Theory" by Taizo Iijima, Morikita Syuppan (1989) and "Subspace Method of Pattern recognition" by Erkki Oja, Research Studies Press.

In a mutual subspace method, first a dictionary pattern distribution is represented as a subspace to generate a dictionary subspace beforehand. The subspace can be generated by obtaining base vectors for that. Then, an input pattern distribution, which is a recognition object, is represented as a subspace, to generate an input subspace. Next, a minimum canonical angle is obtained which is formed between the input subspace and each of the dictionary subspaces generated beforehand, to decide that the recognition object belongs to a category which corresponds to such a dictionary subspace as to provide a smallest value of the minimum canonical angle. Belonging to a category means that, for example, in the case of a human face to be recognized using an image, "a person subject to recognition presently is already registered in the relevant dictionary".

The mutual subspace method represents both an input side and a dictionary side as a subspace and so is superior to the subspace method in capacity of pattern deformation absorption. However, the mutual subspace method does not take into account a relationship with respect to other categories in representation, thus having such a problem that, for example, face recognition is liable to be influenced by illumination conditions.

Therefore, a method called a "constrained mutual subspace method" for preparing beforehand a "constraint subspace" constituted of essential features necessary in discrimination and projecting a comparison-subject subspace onto a constraint subspace and then applying a mutual subspace method is proposed in "Face Recognition under Variable Condition with Constrained Mutual Subspace Method—Learning of Constraint Subspace to Reduce Influence of Lighting Changes—" by Kazuhiro Fukui, Osamu Yamaguchi, Kaoru Suzuki, and Kenichi Maeda, Electronic Information Communication Society Literature Journal (D-II), Vol. J82-D-II, No. 4, pp. 613-620, 1999 and Jpn. Pat. Appln. KOKAI Publication 2000-30065.

In the constrained mutual subspace method, as shown in FIG. 7, subspaces P' and Q' which have been obtained by projecting comparison-subject subspaces P and Q onto a constraint subspace L are compared to each other by the mutual subspace method. Since the subspaces P' and Q' inherit essential features of the subspaces P and Q respectively, a difference between the subspaces P' and Q' consists of an essential portion which is extracted from differences (which are represented as a vector d but typically as a difference space) between the subspaces P and Q. Therefore, the present method has an advantage in being superior to the mutual subspace method in capacity of absorbing pattern deformation.

In a conventional constrained mutual subspace method, a constraint subspace is generated procedure-wise from an aggregate of difference subspaces which represent a difference between two subspaces.

In the procedure-wise generation method, first a difference subspace is generated for each of all combinations of subspaces which belong to the same category, to generate a first variation subspace from a principal component subspace of every difference subspace. The "subspaces which belong to the same category" refer to "subspaces generated from a face image of the same person" if exemplified in face recognition which uses an image. Next, a difference subspace is obtained for each of all combinations of subspaces which belong to a different category, to generate a second variation subspace from a principal component subspace of every difference subspace thus obtained.

The first variation subspace thus obtained corresponds to a "variation which occurs upon photographing of the same person under different conditions (expression, illumination, etc.)" in the case of face recognition by use of an image and so may be referred to as a space obtained by extracting components which are hopefully suppressed as much as possible in discrimination. The second variation subspace, on the other hand, corresponds to a "difference from others" in the case of face recognition by use of an image and so may be referred to as a space obtained by extracting components which are hopefully taken into account in discrimination.

Therefore, both the orthogonal complement of a space of the first variation subspace and the second variation subspace are a space obtained by extracting components which are hopefully taken into account in discrimination, so that a portion which is common to these is calculated as a constraint subspace.

By the above-mentioned procedure-wise method for generating a constraint subspace, however, it is necessary to generate a difference subspace for all of the combinations of subspaces. If there are m number of subspaces, it is necessary to calculate a difference subspace mC2 number of times. Accordingly, as the number of categories increases, the number of difference subspaces to be obtained becomes abundant, thus bringing about a problem of a decrease in processing speed.

BRIEF SUMMARY OF THE INVENTION

It is an object of the present invention to provide a pattern recognition apparatus and a method which generates a constraint subspace by a simpler and less-calculating method and uses it.

According to the invention, there is provided an apparatus for generating a pattern recognition dictionary, comprising:

a dictionary pattern input section configured to input a dictionary pattern;

a dictionary subspace generation section configured to generate a dictionary subspace from the dictionary pattern;

a constraint subspace generation section configured to generate a constraint subspace from a sum matrix of projection matrixes of the dictionary subspace;

a dictionary projection section configured to project the dictionary subspace to the constraint subspace to thereby generate a constraint dictionary subspace; and an output section configured to output the constraint subspace and the constraint dictionary subspace.

In the pattern recognition dictionary generation apparatus according to the present invention, the constraint subspace generation section may generate the constraint subspace by using c number of eigenvectors, of eigenvectors of a sum matrix of projection matrixes of the dictionary subspace, which are selected starting from those having a smaller eigenvalue.

In the pattern recognition dictionary generation apparatus according to the present invention, the constraint subspace generation section may generate a constraint subspace by integrating into one subspace such dictionary subspaces as to have been represented from dictionary patterns which belong to the same category.

According to the invention, there is provided a pattern recognition apparatus comprising:

a constraint dictionary subspace memory section configured to store a constraint dictionary subspace which corresponds to a dictionary pattern;

an input section configured to input a recognition-subject input pattern;

a subspace generation section configured to generate an input subspace from the input pattern;

a constraint subspace memory section configured to store beforehand a constraint subspace which is generated using a total sum of matrixes projected onto a dictionary subspace generated from the dictionary pattern;

a subspace projection section configured to project the input subspace to the constraint subspace to thereby obtain a constraint input subspace; and a discrimination section configured to obtain a canonical angle between the constraint input subspace and the constraint dictionary subspace and uses the canonical angle in order to discriminate the recognition-subject input pattern.

Furthermore, the pattern recognition apparatus according to the present invention may store the constraint subspace and the constraint dictionary subspace of outputs provided from the pattern recognition dictionary generation apparatus in the constraint subspace memory section and the constraint dictionary subspace memory section respectively.

According to the invention, there is further provided a pattern recognition dictionary generation method, comprising:

inputting a dictionary pattern;

generating a dictionary subspace from the dictionary pattern;

generating a constraint subspace from a sum matrix of matrixes projected onto the dictionary subspace;

projecting the dictionary subspace to the constraint subspace to thereby generate a constraint dictionary subspace; and outputting the constraint subspace and the constraint dictionary subspace.

Furthermore, in the pattern recognition dictionary generation method according to the present invention, the constraint subspace generation step may generate the constraint subspace by using c number of eigenvectors, of eigenvectors of a sum matrix of projection matrixes of the dictionary subspace, which are selected starting from those having a smaller eigenvalue.

In the pattern recognition dictionary generation method according to the present invention, the constraint subspace generation step may generate a constraint subspace after dictionary subspaces which are generated from dictionary patterns which belong to the same category are integrated into one subspace.

According to the invention, there is furthermore provided a pattern recognition method comprising:

integrating, into one subspace, dictionary subspaces which are represented from dictionary patterns which belong to the same category and then obtaining a projection matrix;

calculating a sum matrix for all or some of categories of the projection matrix; and using as the constraint subspace a subspace which is spanned by c number of eigenvectors, of eigenvectors of the sum matrix, which are selected starting from the eigenvectors having a smaller eigenvalue.

DETAILED DESCRIPTION OF THE INVENTION

The following will describe an apparatus for recognizing a face image, to which a pattern recognition apparatus according to one embodiment of the present invention is applied, with reference to drawings.

FIRST EMBODIMENT

Figure 1:
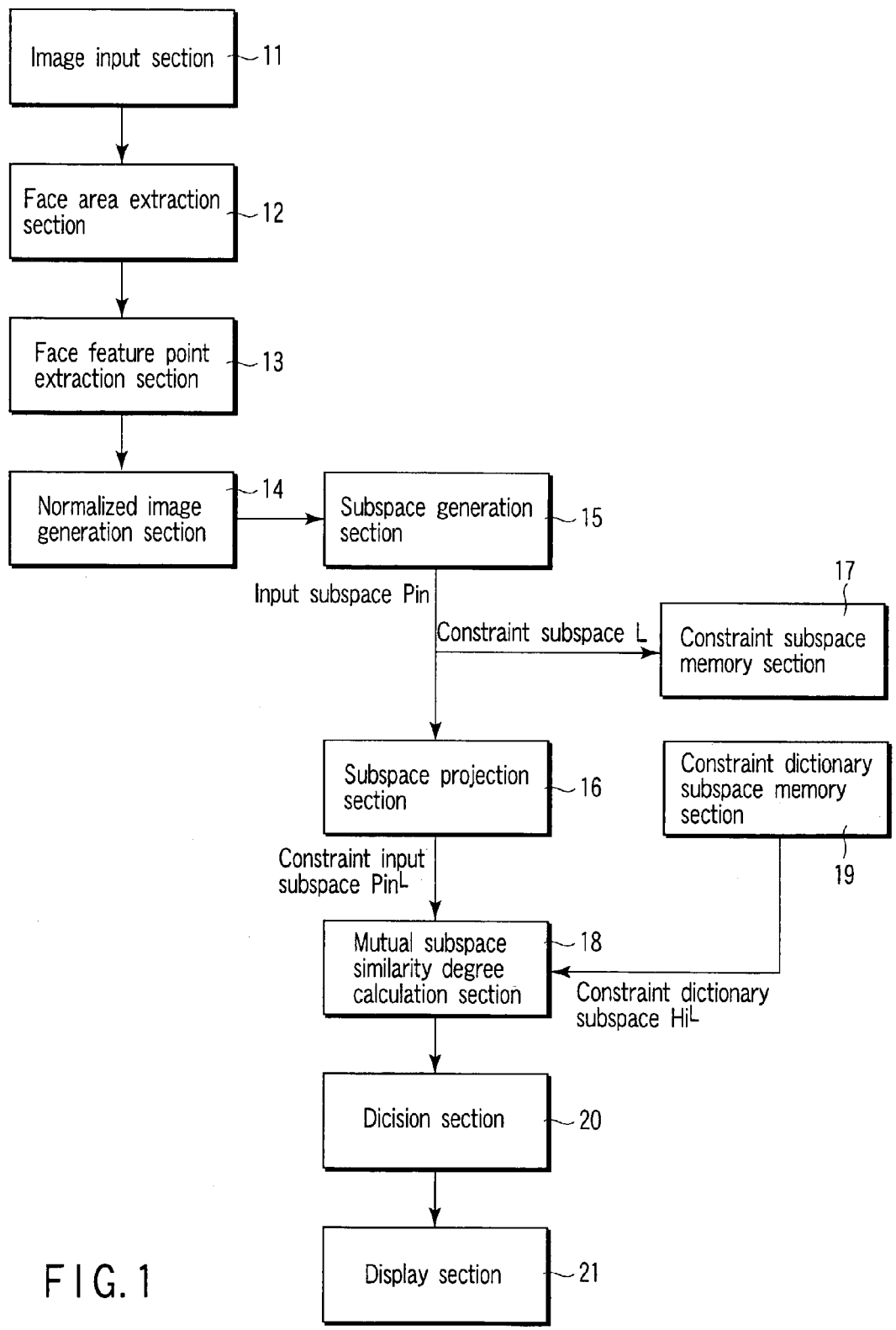
FIG. 1 is a block diagram for showing a configuration of a face image recognition apparatus to which a pattern recognition apparatus according to one embodiment of the present invention is applied.

FIG. 1 is a block diagram for showing a schematic configuration of an apparatus for recognizing a face image according to one embodiment of the present invention. The face image recognition apparatus comprises: an image input section 11 which receives an input image obtained by photographing a recognition-subject person as an image; a face area extraction section 12 which extracts from the input image a face area image in an area which corresponds to the face; and a face feature point extraction section 13 which extracts features points such as the eyes, nose, and mouth from the face area image.

The face image recognition apparatus further comprises: a normalized image generation section 14 which executes transformation to normalize the face area image based on the extracted feature points; a subspace generation section 15 which obtains basis vectors to span an input subspace Pin from a predetermined number of frame of normalized face area images to thereby generate the input subspace Pin; a subspace projection section 16 which projects the input subspace Pin onto a constraint subspace L to thereby obtain basis vectors to span a constraint input subspace PinL and generate the constraint input subspace PinL; and a constraint subspace memory section 17 which stores the basis vectors to span the constraint subspace L.

The face image recognition apparatus further comprises: a mutual subspace similarity degree calculation section 18 which calculates a similarity degree by using a constraint input subspace PinL and a constraint dictionary subspace HiL; a constraint dictionary subspace memory section 19 which stores basis vectors to span a constraint dictionary subspace HiL which has been generated beforehand prior to recognition; a decision section 20 which decides based on an obtained similarity degree whether a person appearing in an input image has been registered in a dictionary (which one of those registered in the dictionary he is if a plurality of persons have been registered); and a display section 21 which indicates a discrimination result etc.

The face image recognition apparatus as shown in FIG. 1 is also disclosed in U.S. Pat. No. 6,466,685 B1 issued Oct. 15, 2002, to Fukui et al. Thus, the entire contents of U.S. Pat. No. 6,466,685 are incorporated herein by reference.

Figure 3:
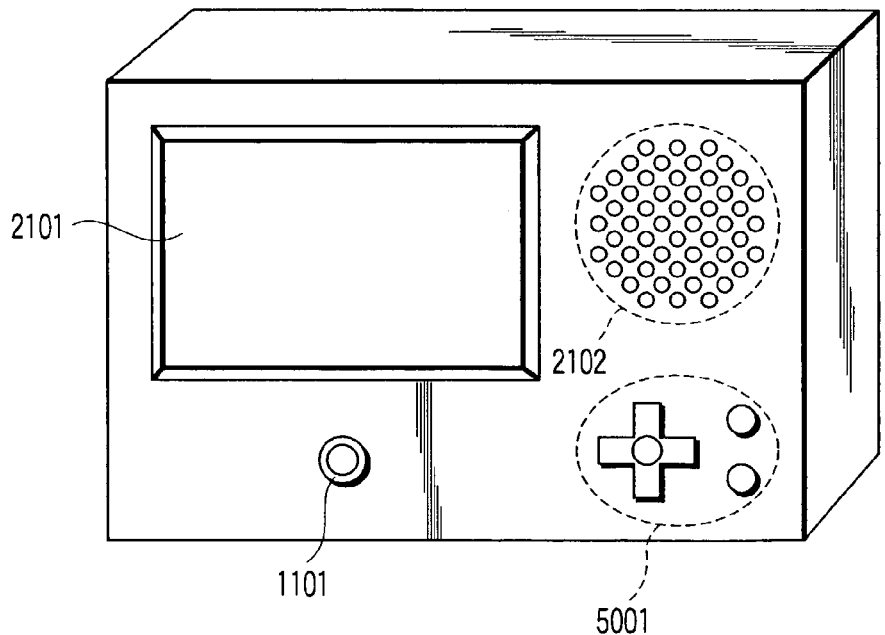
FIG. 3 is an illustration for explaining outer appearances of a face image recognition apparatus to which the pattern recognition apparatus according to the one embodiment of the present invention is applied.

FIG. 3 is an illustration for explaining outer appearances of the present apparatus. To the outside of the present apparatus are there exposed a camera 1101, a monitor 2101, a speaker 2102, and an interface 5001 for operation of the present apparatus.

The camera 1101 is a component which constitutes the image input section 11 and used to obtain an image of a person. The monitor 2101 and the speaker 2102 are components which constitute the display section 21 and used to indicate a discrimination result in an image and a speech respectively. In the present embodiment, the camera 1101 is intended to be mounted on the front face of the present apparatus and below the monitor 2101 but may be mounted appropriately at a different position depending on a service situation etc.

The image input section 11 is used to photograph a recognition-subject person with the camera 1101 to thereby obtain an input image. The input image is converted into digital data by an A/D converter and output. Since the input images are obtained by the camera 1101 sequentially, they are converted from an analog data format into a digital data format and output sequentially.

The face area extraction section 12 extracts a face area from the obtained input images to sequentially generate face area images. The face areas are extracted by executing template matching by use of an average face image registered beforehand. It calculates a correlation value as moving the standard face image in the input images and defines an area having the largest correlation value as a face area. If the correlation value is lower than a predetermined threshold value, however, it decides that there is no face available. Specifically, if a correlation value in the case of a complete 100% match is assumed to be "100", the threshold value is set to "30". In face area extraction, a face area can be extracted further more accurately by using the subspace method to accommodate a variation in face direction or by using a plurality of templates based on a composite similarity degree.

The face feature point extraction section 13 extracts feature points such as the pupil, nose, and mouth edge from an extracted face area image. In the present embodiment, as the feature point extraction method is employed a method, which is proposed in Jpn. Pat. Appln. KOKAI Publication No. 9-251534, for verifying by pattern matching a candidate of a feature point obtained from shape information having a high position accuracy.

The normalized image generation section 14 generates a normalized image by executing normalization processing based on the pupil and the nostril which is proposed in "Face Recognition System Using Temporal Image Sequence" by Osamu Yamaguchi, Kazuhiro Fukui, Kenichi Maeda, Shingaku-giho, PRMU97-50, pp. 17-24, 1997. By the normalization processing, specifically, affine transformation is executed on a first vector which interconnects the two pupils and a second vector which interconnects a center point of the nostril and that of the pupil so that the first vector may become horizontal, the first and second vectors may cross each other orthogonally, and the first and second vectors may have a predetermined length.

The subspace generation section 15 executes histogram equalization and vector length normalization on normalized images which are consecutively generated by the normalized image generation section 14 and then stores them in a memory not shown. When a predetermined number of frames of normalized images are accumulated, it generates the m-dimensional input subspace Pin, that is, it generates m number of basis vectors to span Pin. In the present apparatus, input images can be continually obtained through the camera 1101 of the image input section 11 and sequentially undergo face area extraction processing, feature point extraction processing, and normalization processing, so that the normalized images can also be obtained continually. If subspaces can also be generated and updated consecutively each time the normalized image is obtained, pattern recognition processing can be executed on-the-fly, thus facilitating pattern inputting. Accordingly, to generate subspaces consecutively, the present apparatus applies a simultaneous iteration method which is described in "Subspace Methods of Pattern Recognition" written by Erkki Oja Research Studies Press.

The subspace projection section 16 projects the input subspace Pin generated by the subspace generation section 15 onto the constraint subspace L stored in the constraint subspace memory section 17, to generate the constraint input subspace PinL according to the following procedure.

First, m number of basis vectors which span the input subspace Pin are projected onto the constraint subspace L. Then, each of these projected basis vectors has its vector length normalized to become a normalized vector. Furthermore, the normalized vector undergoes Gram-Schmidt orthogonalization to become a ortho-normalized vector. The m number of ortho-normalized vectors generated according to this procedure constitute basis vectors of the constraint input subspace PinL which is generated by projecting the input subspace Pin onto the constraint subspace L.

A n-dimensional constraint dictionary subspace HiL of a person i which is stored in the constraint dictionary subspace memory section 19 is a subspace which is obtained by projecting a dictionary subspace Hi which corresponds to each person onto the constraint subspace L and is generated beforehand by the subspace projection section 16 at a moment when the person i is registered in a dictionary. A procedure for generating the n-dimensional constraint dictionary subspace HiL is described later.

The number of dimensions of each of the input subspace Pin, the dictionary subspace Hi, and the constraint subspace L is experimentally determined corresponding to a data type. It is experimentally known that in the case of a face pattern preferably the number of dimensions of the input subspace and the dictionary subspace is set to 5-10 and that of the constraint subspace, to 150-180, when the size of the normalized face pattern is 15 pixel×15 pixel (225 dimension).

The mutual subspace similarity degree calculation section 18 calculates for every dictionary a value of $\cos^2 \theta$ of a canonical angle $\theta$ which is formed between the constraint input subspace PinL and the constraint dictionary subspace HiL of the person i (i=1, . . . , k) which is stored in the constraint dictionary subspace memory section 19 and obtains the value as a similarity degree.

Specifically, $\cos^2 \theta$ is defined by the following equations (1) and (2). In these equations, P represents a projection matrix for the constraint input subspace PinL, while H represents a projection matrix for the dictionary subspace HiL. $\lambda i$ is the i-th largest eigenvalue of equation (1).

$$PHP\upsilon = \lambda \upsilon \quad (1)$$

$$\cos^2 \theta i = \lambda i \quad (2)$$

It is to be noted that the similarity degree may come not only in $\cos^2 \theta 1$ but also in a weight mean value, product, product-sum of $\cos^2 \theta i$ (i=1−w, w<min(m,n)).

The decision section 20 decides an identity of a person R if he has a largest similarity degree and at least a predetermined threshold value among m number of persons. In this case, the identity may be decided taking into account the similarity degree of the second candidate and the subsequent. For example, if a difference in similarity degree from the second candidate is smaller than the threshold value, he is left undecided.

The display section 21 has an LCD screen and a speaker, to display a discrimination result on the screen and post it in speech. Furthermore, the display section 21 has an output portion to output a discrimination result to other devices. Although not shown, subsequently, the display section 21 outputs a discrimination result to an electronic key so that it may be used in locking/unlocking based on the discrimination result.

(Procedure for Specifically Generating Constraint Dictionary Subspace)

Figure 2:
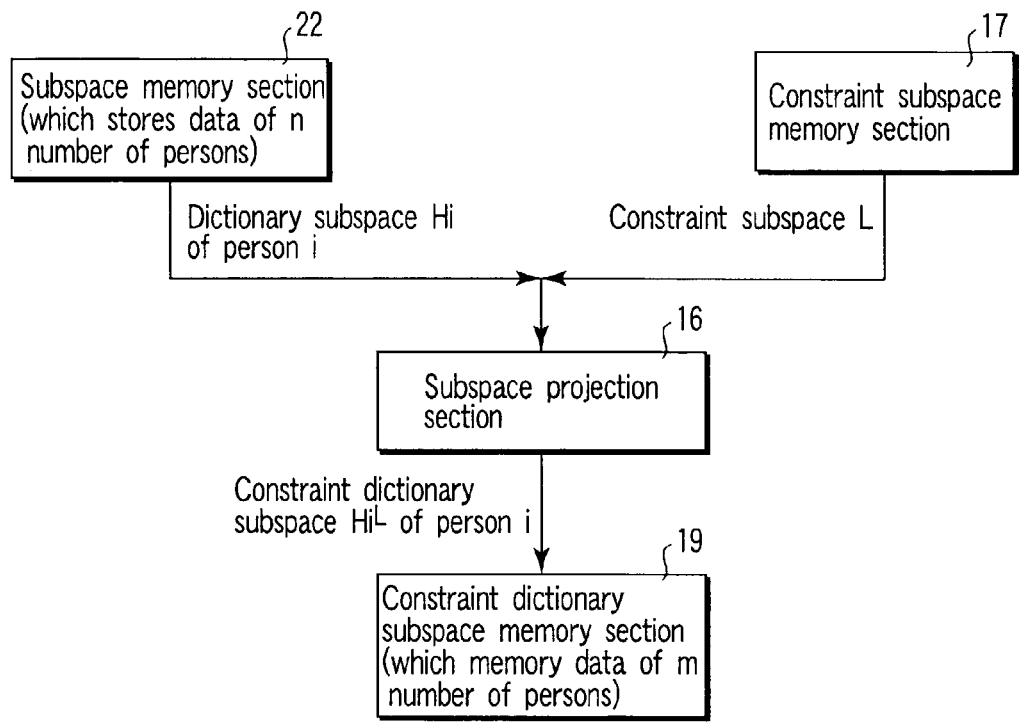
FIG. 2 is a diagram for explaining a procedure for generating a dictionary subspace shown in FIG. 1 and a configuration of a main part related to the generation of the dictionary subspace.

The following will describe each of the components of the present apparatus used in processing of generating a constraint dictionary subspace HiL and storing it in the constraint dictionary subspace memory section 19 and a flow of this processing, with reference to FIG. 2.

FIG. 2 is a diagram for explaining a main part related to generation of a constraint dictionary subspace. The main part includes the subspace projection section 16 which projects the dictionary subspace Hi onto the constraint dictionary subspace HiL, the constraint subspace memory section 17 which stores the constraint subspace L, the constraint dictionary subspace memory section 19 which stores the generated constraint dictionary subspace HiL, and a subspace memory section 22 which stores the dictionary subspace Hi which is generated utilizing the sections of from the image input section 11 to the subspace section 15 of FIG. 1. All of these sections are the same as those in FIG. 1, with the subspace memory section 22 not being shown in FIG. 1 though.

In the processing of generating a constraint subspace in the present apparatus, a person to be registered is photographed and then the dictionary subspace Hi is generated; that is, processing of from inputting of a dictionary pattern to generation of a dictionary subspace is the same as that of from photographing of a discrimination-subject person, which is an input pattern in discrimination, to generation of the input subspace Pi and so its explanation is omitted.

The subspace memory section 22 receives the dictionary subspace Hi generated by the subspace generation section 15 and stores it. The subspace projection section 16, on the other hand, reads out the constraint subspace L from the constraint subspace memory section 17 and sequentially reads out the dictionary subspaces Hi stored in the subspace memory section 22 to project them to the constraint subspace L, thus sequentially generating the constraint dictionary subspaces HiL. The constraint dictionary subspace memory section 19 stores these generated constraint dictionary subspaces HiL.

(Procedure for Specifically Generating Constraint Subspace)

Figure 4:
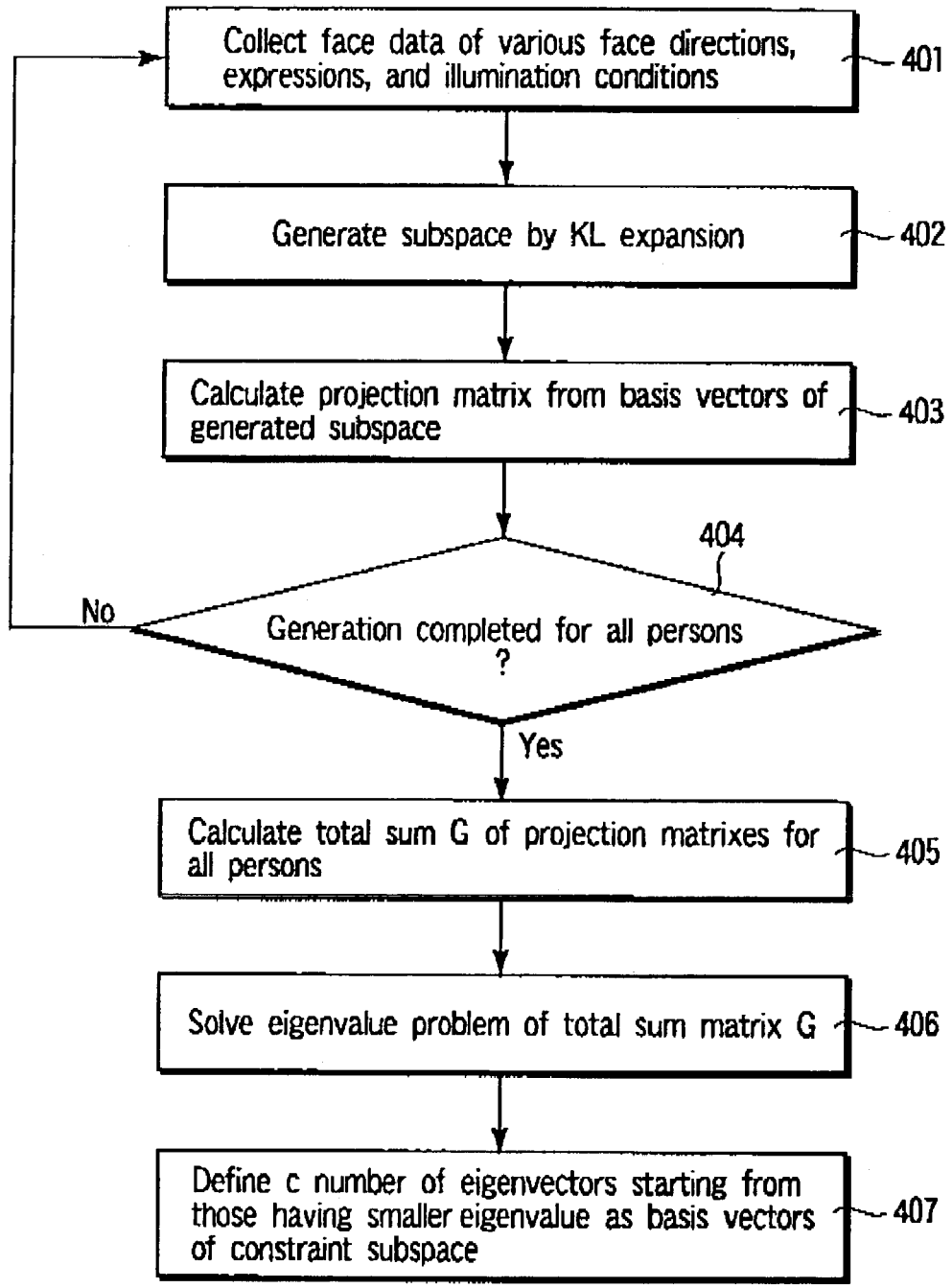
FIG. 4 is a diagram for explaining processing for generating a constraint subspace shown in FIG. 1.

The following will describe a procedure for generating a constraint subspace using a case of human face recognition as an example, with reference to FIG. 4.

First, for each person, the process collects normalized face patterns which include a variety of face directions, expressions, illumination conditions, etc. They are collected using a method described in "Face Recognition System Using Temporal Image Sequence" by Osamu Yamaguchi, Kazuhiro Fukui, and Kenichi Maeda, Shingaku-giho, PRMU97-50, pp. 17-24, 1997; during collection, the faces of those registered are photographed as an image in various directions such as upward/downward and rightward/leftward directions as altering the illumination conditions variously (S401).

After pre-processing such as histogram equalization and vector length normalization is conducted on the data of the collected normalized images, the process applies KL expansion to obtain basis vectors to span a subspace. In this case, if subspaces are already generated from face images of the same person obtained under different conditions, they are integrated into one subspace beforehand. That is, each person is assigned only one subspace (S402). Then, the process calculates a projection matrix from the basis vectors of the subspace thus obtained (S403).

The process repeats processing of from step S401 to S403 until all persons (which are assumed to be as many as m) are registered (S404).

The process obtains a total sum G of projection matrixes of the subspaces of the m number of persons which are thus generated (S405). The process then solves an eigenvalue problem of the matrix G, to obtain an eigenvalue (S406). The process selects c number of eigenvalues of these starting from the lower-valued ones, to define eigenvectors which correspond to these eigenvalues as basis vectors of the constraint subspace L having c-number of dimensions (s407).

A respect to be noticed in obtaining of the constraint subspace L according to this procedure is to "assign only one subspace to each person". That is, subspaces generated from images of the same person taken by photographing them under different conditions are to be integrated into one subspace beforehand. Without this integration, a variation in the same category (that is, the same person) to be originally contained in a principal component subspace P may be contained in a constraint subspace L, thus resulting in a degraded discrimination accuracy.

Figure 5:
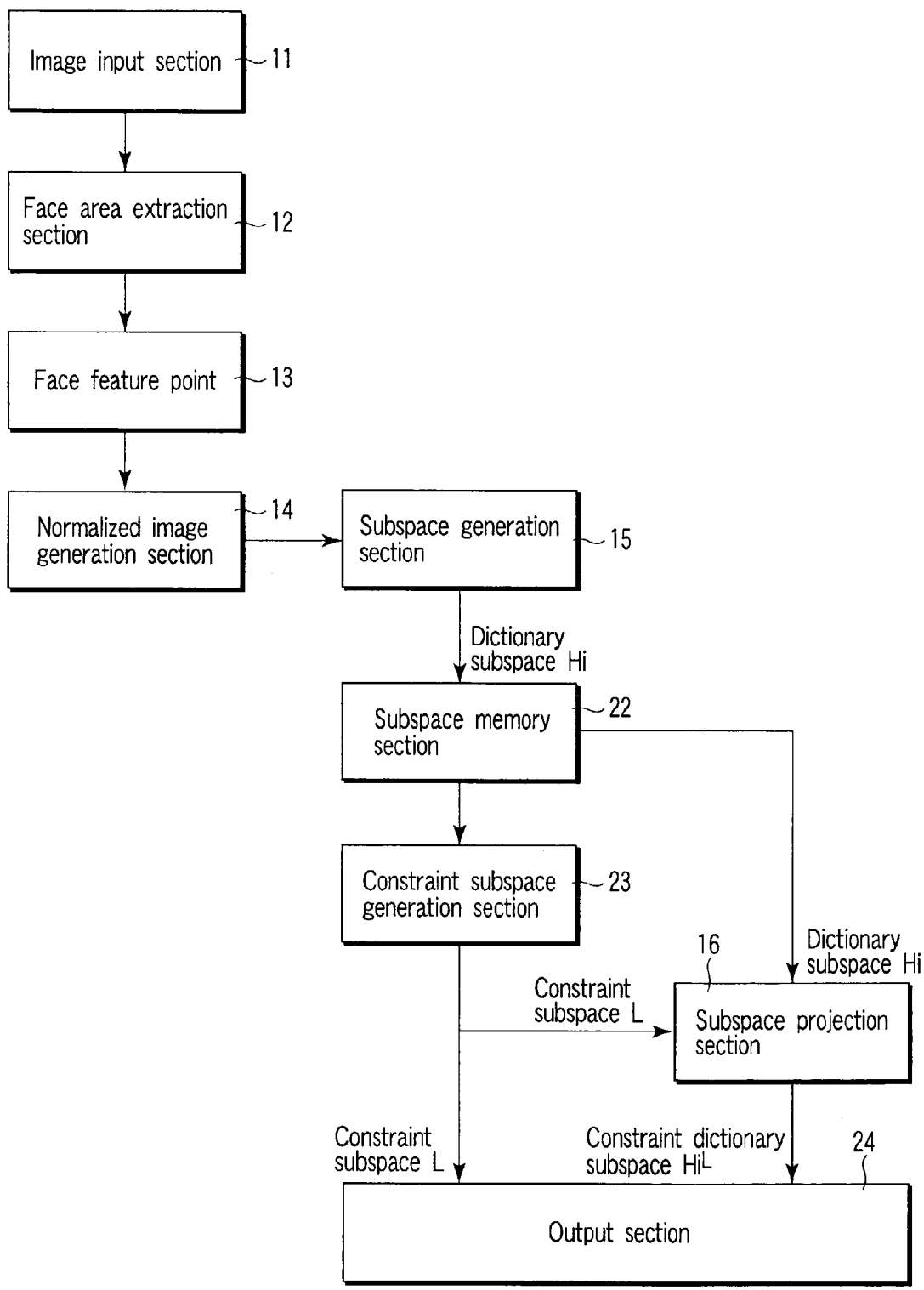
FIG. 5 is a block diagram for explaining a configuration of a pattern recognition dictionary generation apparatus for generating a constraint subspace and a constraint dictionary subspace shown in FIG. 1.

FIG. 5 shows a configuration of an apparatus for generating the above-mentioned constraint subspace and constraint dictionary subspace. This apparatus comprises the same image input section 11, the face area extraction section 12, the face feature point extraction section 13, the normalized image generation section 14, the subspace generation section 15, and the subspace projection section 16 as those of the pattern recognition apparatus of FIG. 1.

First, the process uses the image input section 11, the face area extraction section 12, the face feature point extraction section 13, the normalized image generation section 14, and the subspace generation section 15, to generate the dictionary subspace Hi from a dictionary pattern which is input in the same manner as that in the case of face image recognition. The subspace memory section 22 stores the dictionary subspace Hi. The subspace memory section 22 accumulates the dictionary subspaces Hi which have been registered so far.

A constraint subspace section 23 reads out the dictionary subspaces Hi from the subspace memory section 22, to generate a constraint subspace L according to the above-mentioned procedure and output it to the output section 24 and the subspace projection section 16. The subspace projection section 16 uses the constraint subspace L and the subspace Hi to thereby output the constraint dictionary subspace HiL to the output section 24. The output section 24 outputs to an external device not shown the constraint subspace L generated by the constraint subspace generation section 23 and the constraint dictionary subspace HiL generated by the subspace projection section 16. For example, if a face image recognition apparatus shown in FIG. 1 is connected as the external device, the constraint subspace L is stored in the constraint subspace memory section 17 and the constraint dictionary subspace HiL, in the constraint dictionary subspace memory section.

(Method for Generating Constraint Subspace)

The following will describe a method for generating a constraint subspace from each subspace.

The following will describe a two-category discrimination problem first and then expand it to a case of a plurality of categories.

(Two-category Discrimination Problem)

In the two-category discrimination problem, the process applies a difference subspace between two subspaces as a constraint subspace. The difference subspace is a subspace which represents a difference between the two subspaces and can be defined not only on the base of canonical angles formed between the two subspaces but also using a sum of projection matrixes for the two subspaces. The present invention uses a sum of projection matrixes.

A projection matrix X for an n-dimensional subspace A and a projection matrix Y for an m-dimensional subspace B are represented by equations (3) and (4) using basis vectors $\phi_i$ and $\psi_i$ of the subspaces A and B respectively, persuading that the subspace and the projection space are in unique correspondence.

$$X = \Sigma \phi_i \phi_i^T \quad (3)$$

$$Y = \Sigma \psi_i \psi_i^T \quad (4)$$

If m>n is assumed, a sum G2 (=X+Y) of the projection matrixes has (n×2) number of eigenvectors which correspond to (n×2) number of positive eigenvalues of the sum G2 of the projection matrixes. A difference subspace D2 is mathematically indicated that it becomes a space which is spanned by n number of eigenvectors d, of the (n×2) number of eigenvectors of G2, which have an eigenvalue smaller than 1.0. This is indicated by Equation (5).

$$(X+Y) = \lambda d$$

$$D_2 = \text{Space}(d_n, d_{n-1}, \ldots, d_1) \quad (5)$$

Furthermore, a principal component subspace P2 spanned by n number of eigenvectors, of the (n×2) number of eigenvectors of the sum G2 of the projection matrixes, which have an eigenvalue larger than 1.0 can be regarded to be a space common to the two subspaces A and B and interpreted to be a space equally near the subspaces A and B.

It is found from a relationship between the above-mentioned difference subspace D2 and the principal component subspace P2 that the sum space S2 of two subspaces can generally be decomposed in a direct-sum manner into the principal component subspace P2 and the difference subspace D2. Accordingly, the difference subspace D2 may be said to be a space obtained by excluding the principal component subspace P2 from the sum space S2. Therefore, a difference subspace has desirable characteristics in discrimination in that it represents a difference between two subspaces and, at the same time, that it is orthogonal to an average variation of the two subspaces, that is, it is not liable to be influenced by their variations.

(In the Case of Discrimination of a Plurality of Categories)

A definition that "the difference subspace D2 is a space obtained by excluding from a sum space S2 of two subspaces a principal component subspace P2 which is common to these two" is further generalized to define that a difference subspace Dn for a plurality of categories is a space obtained by excluding from a sum space Sn of n number of subspaces a principal component subspace Pn of the n number of subspaces.

Specifically, as indicated by the following equations (6) and (7), the m-dimensional difference subspace Dn for n number of categories is defined to be a space which is spanned by c number of vectors $d_{n \times m}$, $d_{n \times m-1}$, $d_{n \times m-2}$, ..., $d_{n \times m-c+1}$ which are selected starting from those having a smaller eigenvalue from among eigenvectors for a total sum matrix Gn of projection matrixes Xi calculated from each category subspace.

$$G_n = \sum_{k=1}^{n} X_k \quad (6)$$

$$(X1 + X2 + \ldots + Xn) = \lambda d$$

$$D_n = \text{Space}(d_{n \times m} + d_{n \times m-1} + \ldots + d_{n \times m-c+1}) \quad (7)$$

$$\lambda_{n \times m} < \lambda_{n \times m-1} < \ldots < \lambda_{n \times m-c+1}$$

Figure 6:
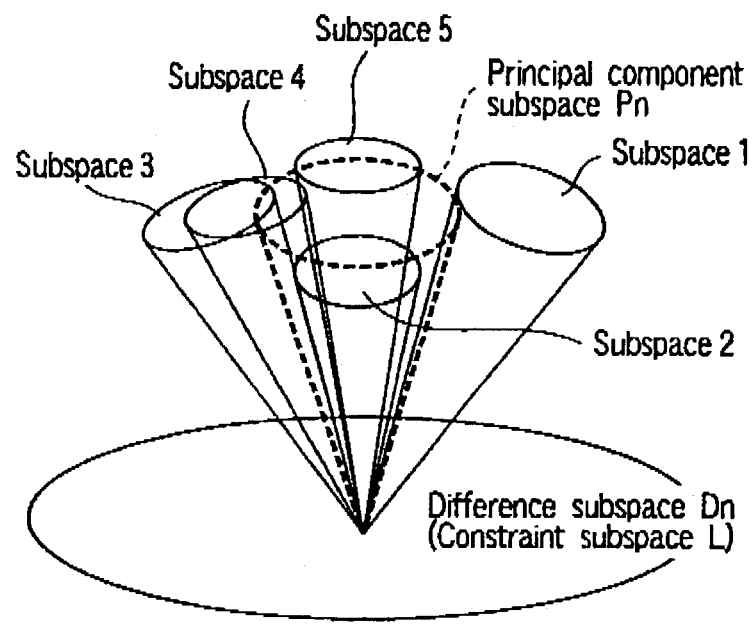
FIG. 6 is an illustration for explaining a relationship between a principal component subspace and a constraint subspace.
Figure 7:
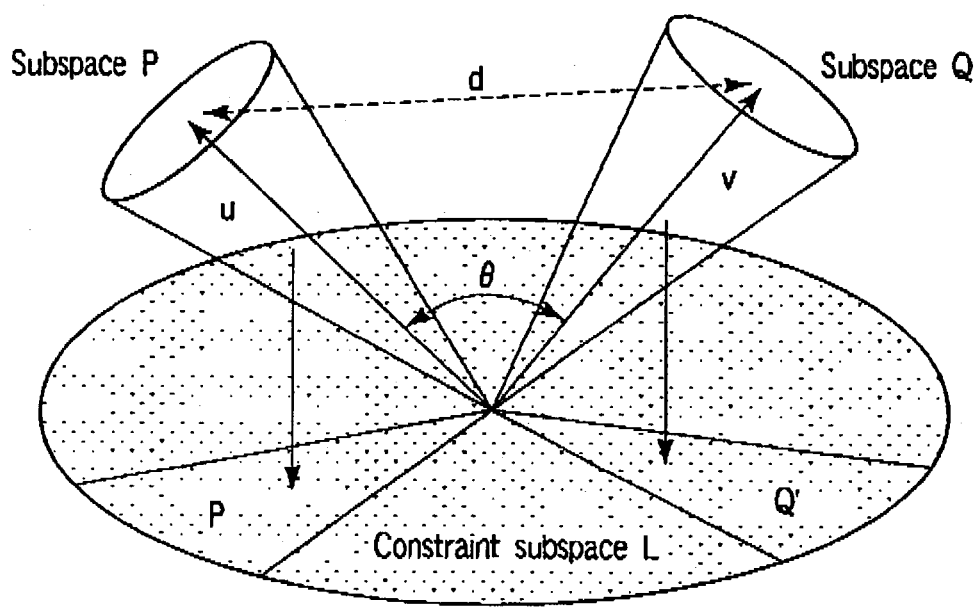
FIG. 7 is an illustration for explaining a concept of a constrained mutual subspace method.

This generalized difference subspace Dn is also desirable in discrimination. This is because, as shown in FIG. 6, the principal component subspace Pn for n number of subspaces indicates an overall average of pattern variations in each category. Therefore, these pattern variations are not contained in the difference subspace Dn which is orthogonal to this principal component subspace Pn but, instead, the other variations, that is, inter-category variation components are contained mainly.

Now, the difference subspace Dn is again defined as a constraint subspace L for a plurality of categories. In such a manner, it is possible to generate the constraint subspace L analytically with simple calculation by using a projection matrix also against a problem of discriminating a plurality of categories. Thus, a quantity of operations can be reduced as compared to a case of a conventional procedure-wise method, thus improving the processing speed.

It is to be noted that the above-mentioned value of c is experimentally known to be preferably 150-180 in the case of face pattern discrimination, when the size of the normalized face pattern is 15 pixel×15 pixel (225 dimension).

Furthermore, although the present embodiment has been described with reference to face recognition by use of a brightness image taken by photographing by use of the camera 1101, the present invention is not limited thereto; for example, it can be applied to typical pattern recognition. The present invention may be applied by using as an input a Fourier spectrum pattern generated from a density image as proposed in, for example, "Robust face identification by pattern matching based on KL expansion of the Fourier spectrum" by Shigeru Akamatsu, Tsutomu Sasaki, and Hideo Fukamachi, Singakuron (D-II), J76-D11, 7, pp. 1363-1373, 1993.

Furthermore, although in the present embodiment an input subspace and a dictionary subspace have been generated on the base of a normalized face pattern, the input subspace and the dictionary subspace may be generated using data obtained by subtracting from the normalized face pattern an average face pattern of an aggregate of a number of normalized face patterns. In this case, a constraint subspace is also generated, according to the above-mentioned procedure, from a subspace generated on the base of the data obtained by subtracting the average face pattern. In discrimination, a subspace generated in the same manner as the case of not subtracting the average face is projected onto the constraint subspace beforehand. Thus, by subtracting the average face, the starting point of a vector which is originally present at an initial point is altered to the center point in an aggregate of the faces, thus expectedly improving discrimination performance.

Furthermore, the generation of the constraint subspace and the projection a subspace onto that are based on the calculations of the inner product. Therefore, the invention can be applied to an non-linear recognition with Kernel function described in "Advances in Kernel Methods—Support Vector Learning" by B. Scholkopf, C. J. C. Burges, A. J. Smola, The MIT Press, 1999.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A pattern recognition dictionary generation apparatus comprising:
   a dictionary pattern input section configured to receive dictionary patterns belonging to categories;
   a dictionary subspace generation section configured to generate one dictionary subspace for each category from the dictionary patterns belonging to the categories;
   a sum matrix calculation section configured to calculate a sum matrix of projection matrixes, the projection matrixes each projecting an arbitrary vector to the one dictionary subspace for each category;
   a constraint subspace generation section configured to generate a constraint subspace from the sum matrix;
   a dictionary projection section configured to project the one dictionary subspace for each category to the constraint subspace to thereby generate one constraint dictionary subspace for each category; and
   an output section configured to output the one constraint subspace for each category and the one constraint dictionary subspace for each category.

2. The pattern recognition dictionary generation apparatus according to claim 1, wherein the constraint subspace generation section comprises:
   an eigenvector calculating section configured to calculate eigenvectors of the sum matrix; and
   an eigenvector selecting section configured to select c number of eigenvectors starting from the eigenvectors having a smaller eigenvalue;
   wherein the constraint subspace generation section generates the constraint subspace from the selected eigenvectors.

3. A pattern recognition apparatus comprising:
   a constraint subspace memory section configured to store a constraint subspace for a category, which is generated from a sum matrix of projection matrixes, the projection matrixes each projecting an arbitrary vector to one dictionary subspace for each category;
   a constraint dictionary subspace memory section configured to store a constraint dictionary subspace for each category, the constraint dictionary subspace being generated by projecting the one dictionary subspace for each category onto the constraint subspace;
   an input section configured to input a recognition-subject input pattern;
   a subspace generation section configured to generate an input subspace from the input pattern;
   a subspace projection section configured to project the input subspace to the constraint subspace to thereby obtain a constraint input subspace; and
   a discrimination section configured to obtain a canonical angle between the constraint input subspace and the constraint dictionary subspace and to discriminate the recognition-subject input pattern by utilizing the canonical angle.

4. The pattern recognition apparatus according to claim 3, wherein the one dictionary subspace is generated from pre-inputted dictionary patterns belonging to each category.

5. The pattern recognition apparatus according to claim 3, wherein eigenvectors of the sum matrix are calculated and c number of selected eigenvectors starting from the eigenvectors having a smaller eigenvalue are selected, and the constraint subspace is generated from the c number of selected eigenvectors.

6. A method of generating a pattern recognition dictionary, comprising:
   inputting a dictionary pattern belonging to a category;
   generating one dictionary subspace for each category from the dictionary pattern belonging to each category;
   calculating a sum matrix of projection matrixes, the projection matrixes each projecting an arbitrary vector to the one dictionary subspace for each category;
   generating a constraint subspace from the sum matrix;
   projecting the one dictionary subspace for each category to the constraint subspace to thereby generate a constraint dictionary subspace for each category; and
   outputting the one constraint subspace for each category and the constraint dictionary subspace for each category.

7. The pattern recognition dictionary generation method according to claim 6, wherein generating the constraint subspace comprises:
 calculating eigenvectors of the sum matrix; and
 selecting c number of eigenvectors starting from the eigenvectors having a smaller eigenvalue;
 wherein the constraint subspace is generated from the c number of eigenvectors.

8. The pattern recognition dictionary generation method according to claim 7, wherein the constraint subspace is generated after the dictionary subspaces generated from the dictionary patterns belonging to the same category are integrated into one subspace.

9. The pattern recognition dictionary generation method according to claim 6, wherein the constraint subspace is generated after the dictionary subspaces generated from the dictionary patterns belonging to the same category are integrated into one subspace.

10. A method of recognizing a pattern, employing a constrained mutual subspace method in which an input subspace and one of dictionary subspaces for categories are projected onto a constraint subspace to suppress common components between the subspaces, and are discriminated, the input subspaces being represented as a subspace of an input pattern and the dictionary subspaces being represented as the subspace of dictionary patterns, method comprising:

integrating the dictionary subspaces into one of the subspaces for the categories, the dictionary subspaces being generated from the dictionary patterns belonging to the same category and then obtaining a projection matrix;

calculating a sum matrix of the projection matrix and calculating eigenvectors of the sum matrix; and generating a constraint subspace from c number of eigenvectors which are selected from the eigenvectors starting from the eigenvectors having a smaller eigenvalue.

* * * * *